United States Patent [19]
Saito et al.

[11] Patent Number: 6,081,794
[45] Date of Patent: *Jun. 27, 2000

[54] DATA COPYRIGHT MANAGEMENT SYSTEM

[75] Inventors: Makoto Saito; Shoichi Okazaki, both of Tokyo, Japan

[73] Assignee: Mitsubishi Corporation, Tokyo, Japan

[ * ] Notice: This patent is subject to a terminal disclaimer.

[21] Appl. No.: 09/206,455

[22] Filed: Dec. 7, 1998

Related U.S. Application Data

[63] Continuation of application No. 08/663,463, Jun. 3, 1996, Pat. No. 5,848,158.

[30] Foreign Application Priority Data

Jun. 2, 1995 [JP] Japan .................................. 7-136808

[51] Int. Cl.$^7$ ...................................................... G06F 17/60
[52] U.S. Cl. ............................... 705/57; 380/202; 705/1
[58] Field of Search ................................ 705/1; 380/21, 380/23, 25; 364/286, 401

[56] References Cited

U.S. PATENT DOCUMENTS

| | | |
|---|---|---|
| 5,291,598 | 3/1994 | Grundy . |
| 5,438,508 | 8/1995 | Wyman .................................. 380/4 X |
| 5,509,074 | 4/1996 | Choudhury et al. ...................... 380/23 |
| 5,646,999 | 7/1997 | Saito ...................................... 380/25 |
| 5,848,158 | 12/1998 | Saito et al. ................................ 380/21 |

FOREIGN PATENT DOCUMENTS 0709760  5/1996  European Pat. Off. .

OTHER PUBLICATIONS

Harn, Lein, et al., "Software Authentication System for Information Integrity," Computers & Security International Journal Devoted to the Study of Technical and Financial Aspects of Computer Security, vol. 11, Dec. 1, 1992, pp. 747–752, XP000332279.

*Primary Examiner*—James P. Trammell
*Assistant Examiner*—Yehdega Retta
*Attorney, Agent, or Firm*—Armstrong, Westerman, Hattori, McLeland & Naughton

[57] ABSTRACT

A data copyright management system is provided, in which a primary user edits a received data and supplies the edited data to a secondary user. The copyright management system comprises a database and a key control center, and uses a primary copyright label, a primary use permit key including a first crypt key, a secondary use permit key, a third crypt key, and a copyright management program. The primary user decrypts the copyrighted primary data, which is encrypted using the first crypt key and supplied, to plaintext using a primary use permit key obtained from the key control center and utilizes it. If the copyrighted primary data is stored in a primary user device, it is re-encrypted using the primary use permit key. The primary user receives a secondary use permit key for editing the copyrighted primary data from the key control center and edits the copyrighted primary data. The data being edited is encrypted using the secondary use permit key and is stored. When edit has been completed, the primary user receives a third crypt key for secondary exploitation right as the secondary copyright from the key control center, encrypts the edited data using the third crypt key and distributes it to the secondary user. The secondary user receives the third crypt key from the key control center and utilizes the edited data. The third crypt key may be generated by the primary user or by the key control center.

1 Claim, 5 Drawing Sheets

DATA COPYRIGHT MANAGEMENT SYSTEM

This is a continuation of application Ser. No. 08/663,463, filed Jun. 3, 1996 Pat. No. 5,848,158.

BACKGROUND OF THE INVENTION

1. Field of the Invention

The present invention relates to a system for managing copyrights for displaying, storing, copying, editing, or transferring digital data.

2. Background Art

In the information-oriented society of today, besides normal terrestrial broadcasting, satellite broadcasting, which is referred to as broadcasting satellites (BS) and communication satellites (CS), and cable TV broadcasting, which is referred to as CATV (cable television), using coaxial cables or optical cables are gaining wide spread acceptance.

In a satellite broadcasting or CATV broadcasting which distributes several tens of channels at the same time, scrambled channels of movies, sport events, and music which cannot be viewed through a comprehensive contract are provided in addition to unscrambled general channels. In order to view these scrambled channels, it is necessary to subscribe to descramble the channels; however, a normal subscription period is about one month, and it is often impossible to view through temporary contracts of shorter duration.

In the Japanese Patent Application Laid-Open No. 6-46419 and the Japanese Patent Application Laid-open No. 6-141004, M. Saito proposed a system in which users obtain a viewing permit key from a charging center via a communication line and are charged, and descramble programs scrambled each by a different scramble pattern, using the viewing permit key to view the programs. An apparatus for such a system was also proposed in the Japanese Patent Application Laid-open No. 6-132916.

In these system and apparatus, those who desire to use scrambled programs send a request for viewing to the charging center via a communication line by using a communication apparatus. The charging center transmits the viewing permit key to the communication apparatus corresponding to the request for viewing, and charges and collects the fee.

Users, on receiving the viewing permit key with the communication apparatus, transmit the viewing permit key to a receiving apparatus via direct means connecting the communication apparatus and the receiving apparatus or via indirect means such as flexible disks or the like. The receiving apparatus to which the viewing permit key is transmitted descrambles the programs using the viewing permit key.

Japanese Patent Application Laid-Open No. 6-132916 describes a system and an apparatus for selling and renting a tape or a disk on which a plurality of data scrambled with different scramble patterns respectively are recorded. Specific data can be utilized using the viewing permit key provided by IC cards or the like.

In addition, in today's information-oriented society, computer communication networks are available for mutually using data which are stored independently by each computer. Such computer communication networks include LAN (local area network), WAN (wide area network), or an international network known as Internet.

Recently, a new digitization technique has been developed for reducing the information amount by compressing a television moving picture signal which could not be digitized in the past because of a huge amount of information generated by digitization. So far, H.261 standards for video conference, JPEG (joint photographic image coding experts group) standards for static pictures, MPEG 1 (moving picture image coding experts group 1) standards for storing pictures and MPEG 2 standards to cover the current television broadcast and high-definition television broadcast are available.

The digitization technique using the picture compression technology can be used not only for the television broadcasting or the video picture recording, but also for television moving picture data which could not be handled by computer before. Thus, the "multimedia system" which can handle various types of data used by computers and digitized television moving picture data at the same time has attracted interest as a future technology. This multimedia system is also incorporated in the data communication and can be used as data on the database.

With the utilization range of databases being expanded, the method for charging for the data use on the database, and how to manage copyright problems associated with copying, transmitting other than direct use of data, and also the secondary exploitation right associated with data editing have become important issues. To prevent unauthorized use of data, it is necessary to take measures so that the data cannot be used by users other than authorized users, and data encryption is the best means for this purpose.

For the television systems, database systems or electronic commercial transaction systems or the like, a crypt key is required for encryption and decryption of data. A crypt key must be delivered to data users. However, the whole procedure for encryption and decryption is complicated because of tight security and high reliability requirements.

A general description of cryptography is provided below.

In the cryptography, the encryption to encrypt a plaintext M using a crypt key K and to obtain a cryptogram C is expressed as:

$$C=E(K, M)$$

and decryption to obtain a plaintext M from the cryptogram C using a crypt key K is expressed as:

$$M=D(K, C).$$

Further, M. Saito has proposed a concrete arrangement of a data copyright management system in Japanese Patent Application No. JP-A 6-64889. In this system, in order to manage copyrights in display (including the process to turn to audio signal), storage, copying, editing and transferring of digital data in a database system including real-time transmission of digital picture, one or more of the programs to manage the copyrights, copyright information or the copyright management message are transmitted, when needed, in addition to a permit key to allow the user to utilize the encrypted data.

When the user attempts to utilize the data beyond the conditions of the permission or request, a copyright management message is displayed on the screen, to caution or warn the user. The copyright management program watches and manages in such manner that no utilization of data is performed beyond the conditions of request or permission.

The data is encrypted and supplied, and is then decrypted using a permit key to be utilized. When the data is stored in a device, is copied to a medium other than the device, or is transferred outside the device, re-encryption is performed.

Also, a permit key is provided for each utilization such as displaying, using, storing, copying, editing, transferring, etc.

SUMMARY OF THE INVENTION

The system according to the present invention comprises a database, a key control center, a primary user, a secondary user, and a network system. The network system provides interconnections for the system elements. A primary copyright label, a primary use permit key including a first crypt key, a secondary use permit key including a second crypt key, a secondary copyright label, a third crypt key, and a copyright management program are used.

When a plaintext copyrighted primary data is supplied to a primary user, the data is encrypted using a first crypt key. When the primary user desires to utilize the encrypted copyrighted primary data, the user sends a request for distribution of a permit key for primary utilization via a network system to a key control center. When the request for distribution of the permit key for primary utilization is received from the primary user, the key control center sends the permit key for primary utilization to the primary user and charges the fee.

Using a first crypt key including in the received primary use permit key, the primary user decrypts the encrypted copyrighted primary data. In case the plaintext copyrighted primary data is stored in a device of the primary user, the data is re-encrypted using the primary use permit key.

When the primary user desires to utilize the copyrighted primary data, the primary user sends a request for distribution of a secondary use permit key for editing the plaintext copyrighted primary data to the key control center via the network system. The key control center sends the secondary use permit key to the primary user.

Upon receiving the secondary use permit key, the primary user copies the copyrighted primary data and edits the copy of the copyrighted primary data. When the plaintext copyrighted secondary data which is the copyrighted primary data being edited is stored in the device of the primary user, the data is encrypted using a second crypt key included in the secondary use permit key. When the final edited data is stored in the device of the primary user, the data is encrypted using a third crypt key.

As a result of secondarily processed data which is secondary data edition of the copyrighted data, the primary user now possesses the secondary exploitation right as secondarily generated copyright. In order to execute the secondary exploitation right, the third crypt key is registered at the key control center. The encrypted copyrighted secondary data obtained by encryption of the plaintext copyrighted secondary data using the third crypt key is sent to the secondary user by copying it to an external storage medium or by transferring it via the network system.

The secondary user who desires to utilize the encrypted copyrighted secondary data sends a request for distribution of the third crypt key to the key control center. Upon receiving the request for distribution of the third crypt key, the key control center sends the third crypt key to the secondary user via the network system. When the secondary user receives the third crypt key, the secondary user decrypts the encrypted copyrighted secondary data by third crypt key, and utilizes it.

DETAILED DESCRIPTION OF THE INVENTION

The present invention is a database copyright management system. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

The detailed embodiments of the invention are described below with reference to the drawings.

Figure 1:
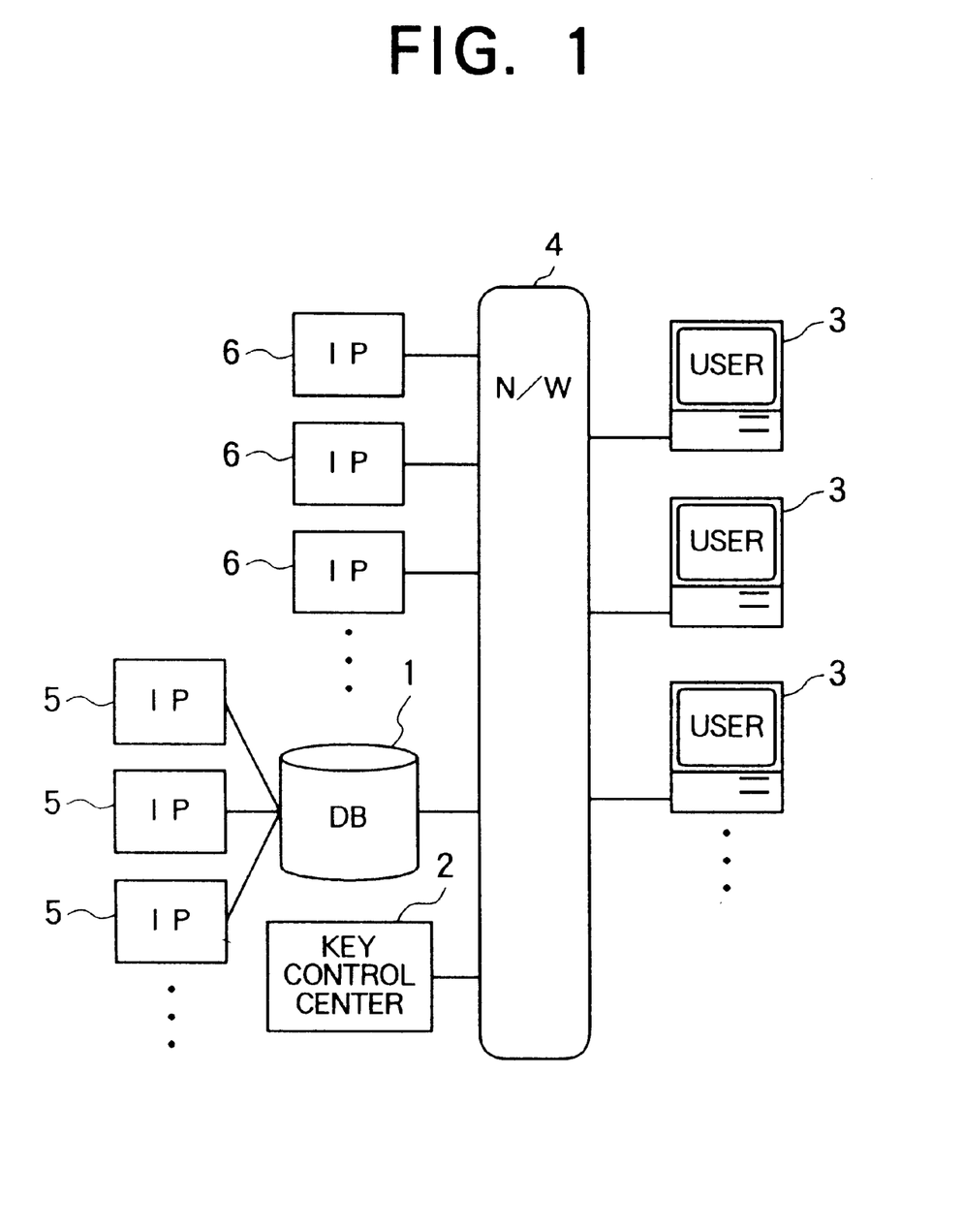
FIG. 1 is a block diagram of an embodiment of a data copyright management system according to the present invention.

A system shown in FIG. 1 comprises a database 1, a key control center 2, users 3, 3, 3, . . . and a network system 4, which provide interconnections for system elements. To the database 1, data is supplied from information providers (IP) 5, 5, 5, . . . In some cases, the data is supplied to the user directly from the information providers 6, 6, 6, . . . via the network system 4 without going through the database 1. The data utilized in the present embodiment are objects where program and data are combined together. The users 3 are not mere utilizers, but can be information providers 5 or 6, who provide secondary exploitation works, i.e. newly produced copyrighted works, by combining or modifying a plurality of copyrighted data, which they received.

In the data copyright management system according to the present invention as described above, each of the copyrighted data provided from the information providers 5 and 6 is encrypted to protect the copyright. Therefore, when the user 3 receives the encrypted copyrighted data, it must be decrypted to be utilized. For this purpose, all crypt keys are deposited to the key control center 2 in this system and are under the control of the key control center 2. The cryptosystem adopted by each of the information providers 5 and 6 may be freely chosen, while the cryptosystem to be used in the secondary exploitation for secondarily utilizing data as described later is limited to the system adopted by the key control center.

The data from the database is generally utilized using personal computers, and the OS used in these personal computers must have security processing incorporated in it. For the control of crypt keys, the copyright management program is used. For the storage of the copyright management program and the crypt keys received from the key control center 2, "key cards" realized as software on memory or HDD (Hard Disk Drive) or realized as hardware in form of a unique board, PC card, etc. are prepared as the storage area.

The key control center stores the crypt keys for protection of copyright of data and for charging fees for utilization of the copyright regardless of whether the data is actually utilized or simply registered and not utilized, and controls the crypt keys by coordinating the stored keys with copyright labels.

Figure 2:
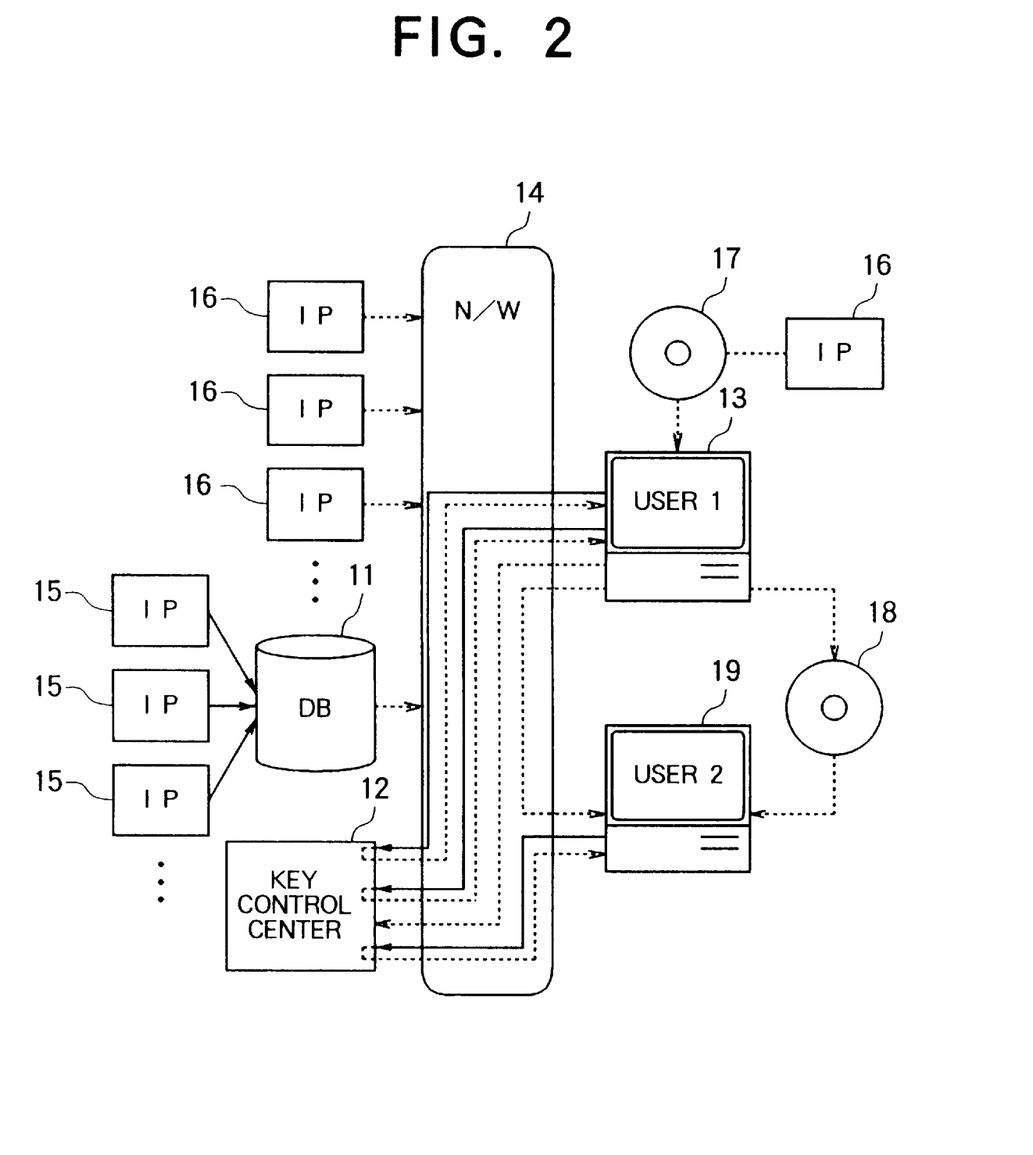
FIG. 2 is a schematic block diagram of an embodiment of a system managing data copyrights according to the present invention.

FIG. 2 represents a schematic configuration of an embodiment of a data copyright processing system according to the present invention, in which a primary user receiving data from an information provider edits the received data and supplies the edited data to a secondary user. In this system, a plaintext copyrighted primary data D1, an encrypted copyrighted primary data ED1$i$, a plaintext copyrighted secondary data D2, an encrypted copyrighted secondary data ED2$j$, a plaintext primary copyright label Lc1, a primary use permit key K1 including a first crypt key K1$i$, a secondary utilization permit key K2, a third crypt key K3$j$, and a plaintext copyright management program Pc are used.

The system shown in FIG. 2 comprises a database 11, a key control center 12, a primary user 13, a secondary user 19, and a network system 14 for connecting the system elements. To the database 11, data are supplied from information providers 15,15, 15, . . . In some cases, the data may be supplied to the user 13 from the information providers 16, 16, 16, . . . via the network system 14 or directly via an information recording medium 17 such as a CD-ROM from the information providers 16 without going through the database 11. In FIG. 2, solid lines represent paths of plaintext data, broken lines represent paths of encrypted data, and dotted lines represent paths of keys.

In this system, the plaintext copyrighted primary data D1$i$ is supplied to the primary user 13 under the copyrighted primary data ED1$i$ encrypted using the first crypt key K1$i$:

$$ED1i=E(K1i, D1i)$$

from the information provider 15 via the network system 14 through the database 11, or from the information provider 16 via the network system 14, or via an information recording medium 17 such as a CD-ROM. The primary user 13 who desires to utilize the encrypted copyrighted primary data ED1$i$ and is thus supplied sends a request for distribution of a primary use permit key K1 by presenting a primary copyright label Lc1 to the key control center 12 via the network system 14.

Upon receiving the request for distribution of the primary use permit key K1 from the primary user 13, the key control center 12 searches for the primary use permit key K1 using the presented primary copyright label Lc1 and sends the primary use permit key K1 to the primary user 13 via the network system 14 and charges the fee at the same time. The primary user 13 decrypts the encrypted copyrighted primary data ED1$i$ using the first crypt key K1$i$ included in the received primary use permit key K1:

$$D1i=D(K1i, ED1i)$$

and utilizes it.

In case the decrypted plaintext copyrighted primary data D1$i$ is stored in a device of the primary user 13, it is re-encrypted using the first crypt key K1$i$:

$$ED1i=E(K1i, D1i),$$

and the re-encrypted copyrighted primary data ED1$i$ is stored. In case the re-encrypted copyrighted primary data ED1$i$ is to be utilized again, the encrypted copyrighted primary data ED1$i$ is re-decrypted and re-encrypted.

The primary user 13, who desires to edits the plaintext copyrighted primary data D1$i$, sends a request for distribution of the secondary use permit key K2 for editing of the plaintext copyrighted primary data D1$i$ to the key control center 12 via the network system 14.

Upon receiving the request for distribution of the secondary use permit key K2, the key control center 12 sends the secondary use permit key K2 to the primary user 13 via the network system 14. When the secondary use permit key K2 is received, the primary user 13 edits the plaintext copyrighted primary data D1$i$ according to the content of the permit key and obtains the plaintext copyrighted secondary data D2$j$. In case the plaintext copyrighted secondary data D2$j$ is to be stored in a device of the primary user 13, the plaintext copyrighted secondary data D2$j$ is encrypted using the second crypt key K2:

$$ED2j=E(K2, D2j).$$

When the editing is complete, the primary user 13 generates a third crypt key K3$j$ in order to execute the secondary exploitation right for data editing of the copyrighted secondary data, and the third crypt key K3$j$ thus generated is registered at the key control center 12. The third crypt key may not be generated by the primary user 13, but it may be prepared and distributed by the key control center at the request of the primary user 13.

In case the primary user 13 copies the plaintext copyrighted secondary data D2$j$ to an external storage medium 18 or transfers it via the network system 14, the plaintext copyrighted secondary data D2$j$ is encrypted using the third crypt key:

$$ED2j=E(K3j, D2j),$$

and the encrypted copyrighted secondary data ED2$j$ is supplied to a secondary user 19.

The secondary user 19, who desires to utilize the encrypted copyrighted secondary data ED2$j$ and is thus supplied, sends a request for distribution of the third crypt key K3$j$ to the key control center 12 via the network system 14. Upon receiving the request for distribution of the third crypt key K3$j$ from the secondary user 19, the key control center 12 sends the third crypt key K3$j$ to the secondary user 19 via the network system 14. When the third crypt key K3$j$ is received, the secondary user 19 decrypts the encrypted copyrighted secondary data ED2$j$ using the third crypt key K3$j$:

$$D2j=D(K3j, ED2j)$$

and utilizes it. In the case that the encrypted copyrighted secondary data ED2$j$ is to be utilized again, the encrypted copyrighted secondary data ED2$j$ is decrypted and encrypted using the third crypt key K3$j$.

In the following, detailed description will be given on acquisition of the copyrighted primary data, primary utilization of the copyrighted primary data, editing of the copyrighted primary data to the copyrighted secondary data, supply of the edited copyrighted secondary data, and utilization of the copyrighted secondary data. In this system, a plurality of plaintext copyrighted primary data D1$i$ are supplied to the primary user 13 with the encrypted copyrighted primary data ED1$i$ using the first crypt key K1$i$ $$ED1i=E(K1i, D1i)$$

together with the plaintext primary copyright label Lc1 directly from the information provider 16 or via the database 11.

The copyright management program Pc manages the use of the copyrighted data by the user. More specifically, the copyrighted data is decrypted and re-encrypted using crypt key and utilization of the copyrighted data is restricted according to the content of the use permit key. In this system, a plaintext primary copyright label Lc1 to be utilized for acquisition of crypt key is attached to the encrypted data ED1j. In other words, the encrypted copyrighted primary data ED1j comprises a plaintext copyright label Lc1 and the encrypted copyrighted primary data ED1i. On the plaintext primary copyrighted label Lc1, title of the data and name of the application program used and the name of the primary copyright owner, etc. are entered.

The primary user 13 who desires to utilize the encrypted copyrighted primary data ED1i and is thus supplied sends a request for distribution of the primary use permit key K1 by presenting the plaintext primary copyright label Lc1 to the key control center 12 via the network system 14.

After confirming that the primary use permit key to be distributed is the key K1 using the presented primary copyright label Lc1, the key control center 12 sends the primary use permit key K1 thus confirmed to the primary user 13 via the network system 14. When the primary use permit key K1 is received, the device of the primary user 13 is turned to copyright management mode, and the primary user 13 is now entitled to utilize the copyrighted primary data. Because the first crypt key K1i is included in the primary use permit key K1, the first crypt key K1i is not recognized by the primary user 13. On the other hand, the key control center 12 charges and collects the fee and identifies the status of use of the copyrighted data and the status of utilization of database of the primary user 13.

Figure 3:
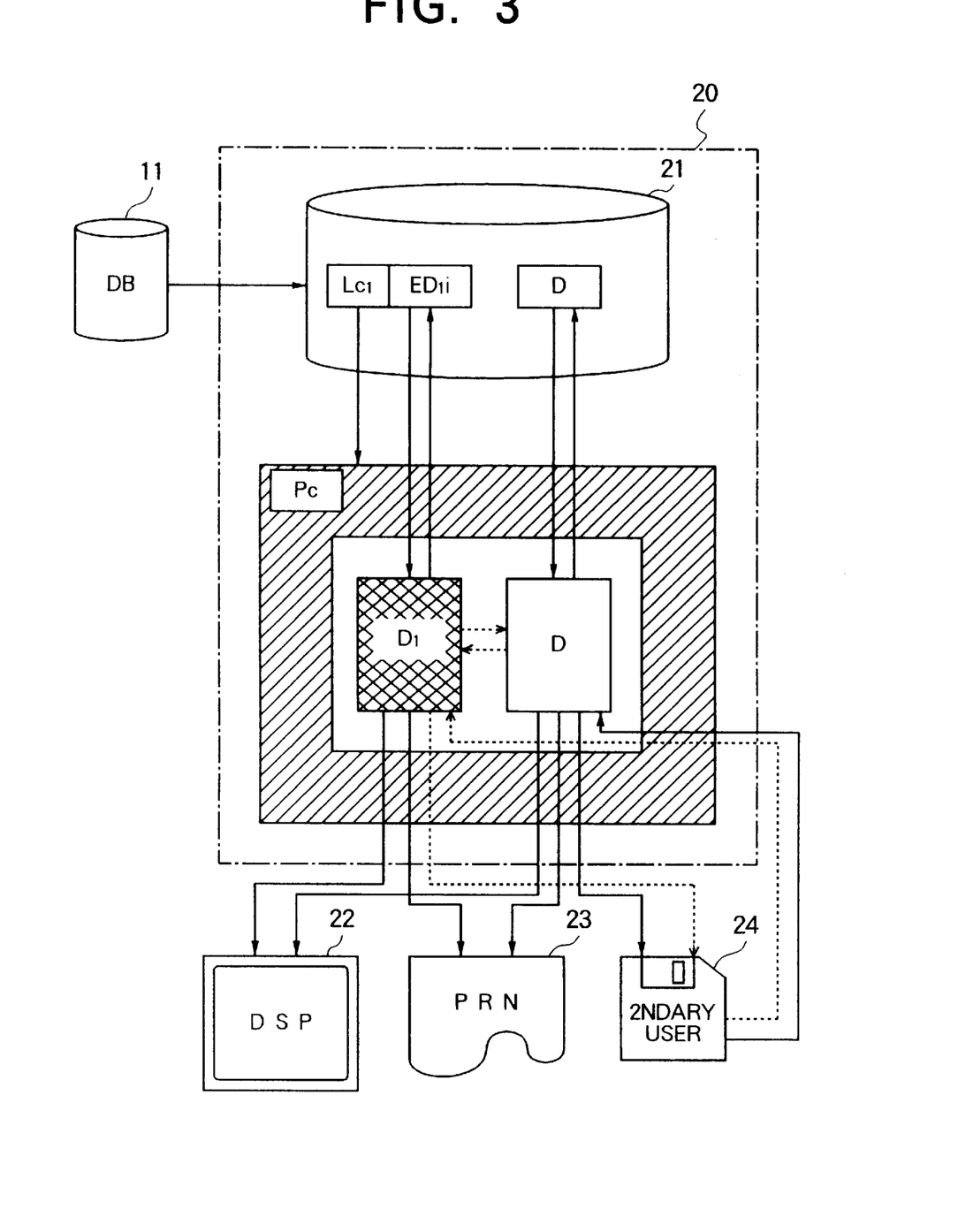
FIG. 3 is a conceptual diagram for explaining limitation of primary utilization executed by a copyright management program Pc in the present invention.

FIG. 3 is a conceptual diagram for explaining restriction of the primary utilization by the copyright management program Pc in the present invention. Similarly to the system described in Japanese Patent Application No. 6-64889, the primary utilization of the data obtained in the data copyright management system of the present invention is limited to ordinary utilization, i.e., direct utilization of the data and output including printing of utilization results, and it is not allowed to copy the data to an external storage medium or to edit and transfer via a network system or in principle, to store the data inside the device. However, it is possible to store the data when encrypted. It is needless to say that the data D other than the copyrighted data can be displayed, printed, stored, copied, edited or transferred by the application program in use.

In FIG. 3, reference numeral 21 represents a storage unit such as a non-volatile semiconductor memory or a hard disk drive incorporated in a device 20 of the primary user, reference numeral 22 represents a display unit for output, 23 represents a printing unit for output, D1 represents a copyrighted primary data, D represents a non-copyrighted general data, 24 represents a secondary user, to whom the data is supplied by copying via a flexible disk or a CD-ROM or by transferring using a network system. In FIG. 3, solid lines represent processing routes permitted, and broken lines show processing routes not permitted.

The encrypted copyrighted primary data ED1i acquired by the primary user 13 from external information providers 15 or 16 either directly or via the data base 11 is incorporated with a plaintext primary copyright label Lc1 which is supplied together with the data ED1i, and is stored in a storage unit 21 of the primary user device 20.

The primary user 13 who desires to utilize the encrypted copyrighted primary data ED1i stored in the storage unit 21 refers to general description of the encrypted copyrighted primary data ED1i and a plaintext primary copyright label Lc1 that shows information of application program used by the encrypted copyrighted primary data ED1i using the copyright management program Pc, and identifies the use environment of the encrypted copyrighted primary data ED1i such as presence or absence of an application program used for preparation of the encrypted copyrighted primary data ED1i.

As a result, it is judged that the encrypted copyrighted primary data ED1i can be utilized. When the primary user 13 inputs request for the use of the encrypted copyrighted primary data ED1i to the copyright management program Pc, the copyright management program Pc starts the application program used by the encrypted copyrighted primary data ED1i and reads the encrypted copyrighted primary data ED1i from the storage unit 21 to memory in the primary user device 20. On the other hand, the plaintext copyright label Lc1 is sent to the key control center 12, and the primary use permit key K1 is supplied to the primary user in accordance with the processing flow already described. The encrypted copyrighted primary data ED1i is decrypted to the plaintext copyrighted primary data D1i, using the first crypt key K1i included in the primary use permit key K1

$$D1i=D(K1i, ED1i),$$

and it can be used by the started application program.

If the plaintext copyrighted primary data D1i on memory of the primary user device 20 is to be stored in the storage unit 21, the plaintext copyrighted primary data D1i is re-encrypted using the first crypt key K1i $$ED1i=E(K1i, D1i),$$

and it is stored. The storage includes producing and storing temporary file for data maintenance. In case the re-encrypted data ED1i is to be re-used, re-decryption and re-encryption are performed using the first crypt key K1i. The utilization other than displaying and printing, storage or editing, i.e. copying to an external storage medium or transfer to other device, of the plaintext copyrighted primary data D1 or the encrypted copyrighted primary data ED1i are prohibited by the copyright management program Pc.

As described above, in the data copyright management system of the present invention, the utilization of the obtained copyrighted data is limited to ordinary modes of utilization, i.e. direct utilization by displaying the data on the display unit 22 or output of the utilization results by the printer 23. Copying of the data to an external storage medium or transfer of the data to the secondary user 24 via the network system and editing the data are prohibited by the copyright management program. Therefore, it is not allowed to cut and paste a part of the copyrighted primary data D1i to the other data D or to cut and paste a part of the other data D to the copyrighted primary data D1i. The copyrighted primary data D1i can be stored to the storage unit 21 exceptionally if it is in the encrypted state using the first crypt key K1i, but it cannot be stored if it has been edited.

In the data copyright management system of the present invention, distinguishing the copyrighted primary data D1 from general data D and determining as to whether the copyrighted data has been edited or not are performed by the copyright management program Pc. Computer file comprises a data file main unit and a management table that includes attributes of the data file. Therefore, by investigating the management table, it can be judged whether the file is the copyrighted data or not. On this management table, data file size and date and time of produced are entered. By investigating these in the management table, it can be judged whether the file has been edited or not.

When stored in the storage unit 21, the copyrighted primary data D1i is to be encrypted and coupled with the primary copyright label Lc1. When the data is decrypted and is read on memory, the copyrighted primary data D1i and the primary copyright label Lc1 are separated from each other by the copyright management program, and the separated copyright label Lc1 is managed by the copyright management program Pc. The copyright management program watches by which application program the copyrighted primary data D1$i$ is used and prohibits "cut and paste" of the copyrighted primary data D1$i$ to the non-copyrighted general data D and "cut and paste" of the non-copyrighted general data D to the copyrighted primary data D1$i$.

Figure 4:
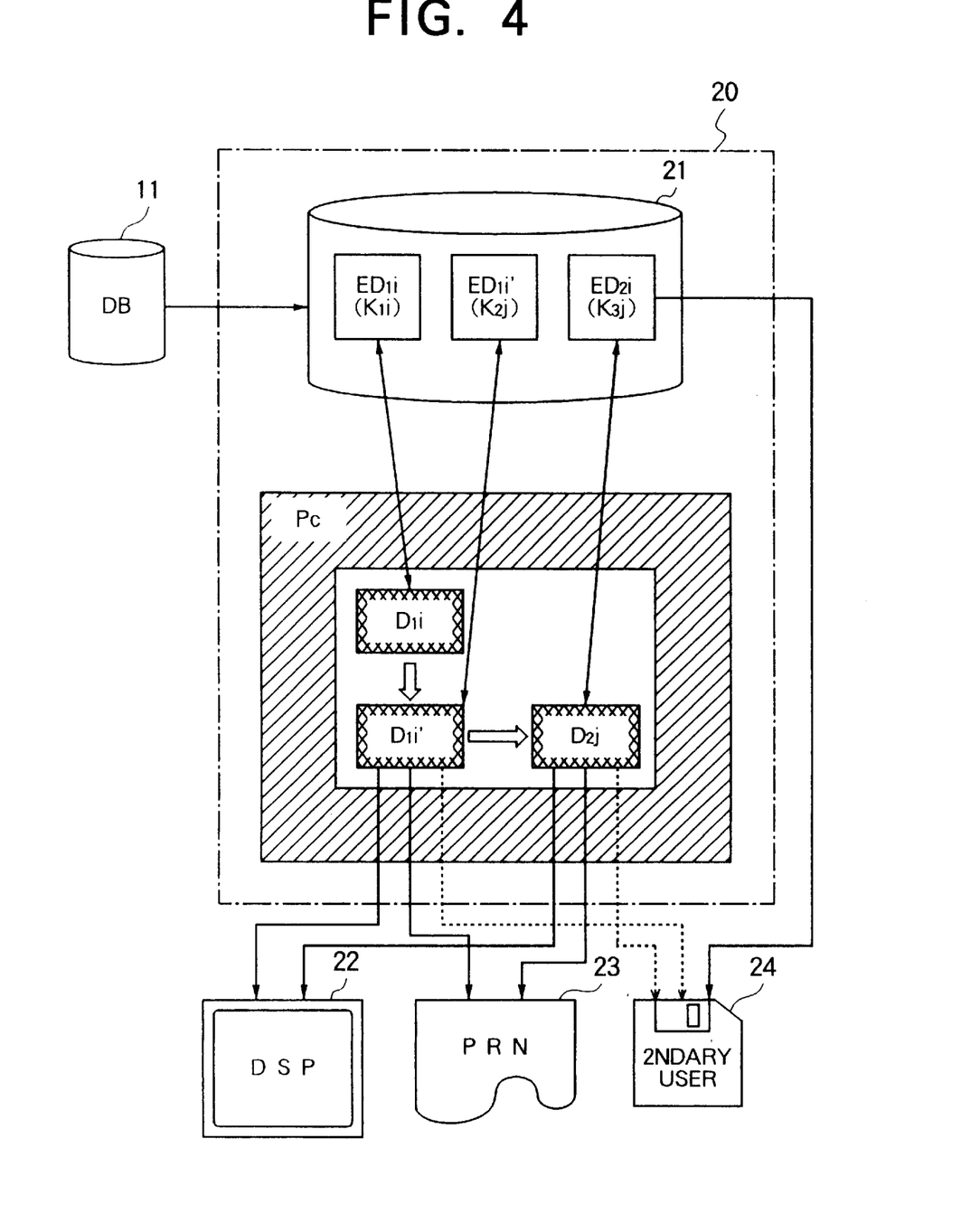
FIG. 4 represents a conceptual drawing for explaining limitation of utilization of data editing executed by a copyright management program Pc in the present invention.

FIG. 4 is a conceptual drawing for explaining restriction of utilization in the data editing executed by the copyright management program Pc in the present invention. The primary user 13 who desires to edit the plaintext copyrighted primary data D1$i$, in the primary utilization, notifies the key control center via the network 14 that the plaintext copyrighted primary data D1$i$ is to be edited and sends a request for distribution of the secondary use permit key K2 necessary for the edit of the plaintext copyrighted primary data D1$i$ to the key control center 12 via the network system 14.

Upon receiving the request for distribution of the secondary use permit key K2 from the primary user 13, the key control center 12 sends the secondary use permit key K2$j$ to the primary user 13 via the network system 14. As a result, the primary user device 20 of the primary user 13 is turned to edit mode, and the primary user 13 can edit the encrypted copyrighted primary data ED1$i$.

The primary user 13 decrypts the encrypted copyrighted primary data ED1$i$ to the plaintext copyrighted primary data D1$i$ using the first crypt key K1$i$, displays it on the display unit 22, and edits the data. To protect the copyright of the copyrighted primary data at first, the plaintext copyrighted primary data D1$i$ for editing is copied, and the plaintext copyrighted primary data D1$i'$ for edit obtained by this copying is edited.

The primary user 13 decrypts the encrypted copyrighted primary data ED1$i$ to the plaintext copyrighted primary data D1$i$ to display on the display unit 22, and before editing, copies the plaintext copyrighted primary data D1$i$ for edit and edits the plaintext copyrighted primary data for editing, D1$i'$, obtained by copying. If the plaintext copyrighted primary data for editing D1$i'$ or the plaintext copyrighted primary data D1$i''$ being edited is to be stored in the primary user device of the user 13, encryption is performed using the secondary use permit key K2

$$ED1i'=E(K2, D1i')$$

or $ED1i'=E(K2, D1i')$, and it is stored as the encrypted copyrighted primary data ED1$i'$ or as the encrypted copyrighted primary data ED1$i''$. As the encrypted copyrighted primary data ED1$i$ is stored in the storage unit 21 without being edited, by comparing its management table with file size, creation date and time of the plaintext copyrighted primary data for editing D1$i'$or D1$i''$ which has been edited, it is judged whether the file is the edited file or not.

When editing of the data has been completed, a plurality of new plaintext copyrighted secondary data D2$j$ is produced, and secondary exploitation right as secondary copyrights is newly generated on the data D2$j$. To protect the secondary exploitation right, the primary user 13 who edited the plaintext primary copyrighted data D1$i$ sends a request for distribution of the third crypt key K3$j$ to the key control center 12. Upon receiving the request for distribution of the third crypt key K3$j$, the key control center 12 sends the third crypt key K3$j$ to the primary user 13 via the network system 14.

When the third crypt key K3$j$ is received, the primary user 13 encrypts the plaintext copyrighted secondary data D2$j$ using the third crypt key K3$j$:

$$ED2j=E(K3j, D2j),$$

and the encrypted copyrighted secondary data ED2$j$ is stored in the storage unit 21 of the primary user 13. If the encrypted copyrighted data ED2$j$ is to be utilized, decryption and encryption are performed using the third crypt key K3$j$.

In the plaintext copyrighted secondary data D2$j$ edited by the primary user 13, secondary exploitation right in data editing of the primary user 13 is present in addition to the primary copyright of the plaintext copyrighted primary data D1$i$ which is before editing and owned by the information provider. To execute the secondary exploitation right, the primary user 13 sends information such as title of the data, name of the application program used, outline of the content, name of the primary copyright owner, etc. together with the third crypt key K3$j$ to the key control center 12. The key control center stores and controls these together with the third crypt key K3$j$.

On the other hand, the primary user 13 supplies the encrypted copyrighted secondary data ED2$j$ to the secondary user 24 by copying it to an external storage medium 18 or by transferring it via the network system 14.

The secondary user 24 who desires to utilize the supplied encrypted copyrighted secondary data ED2$j$ sends a request for distribution of a use permit key including the third crypt key K3$j$ to the key control center 12. The utilization of the plaintext copyrighted secondary data D2$j$ using the use permit key including the third crypt key K3$j$ is limited to general utilization of the plaintext copyrighted secondary data D2$j$ or to storage to the user device, and it is not allowed to copy the plaintext copyrighted secondary data D2$j$ or the encrypted copyrighted secondary data ED2$j$ to an external storage medium 18, to transfer it to a third user via the network 14, or to edit the plaintext copyrighted secondary data D2$j$.

As described above, the copyrighted data handled in the present invention is directed to "object" where program and data are integrated, and the object can be processed as parts-like through computer programming or various types of processing.

Description will be given below on the case where new copyrighted data is produced utilizing a plurality of copyrighted data that are objects, referring to FIG. 5 and FIG. 2.

Figure 5:
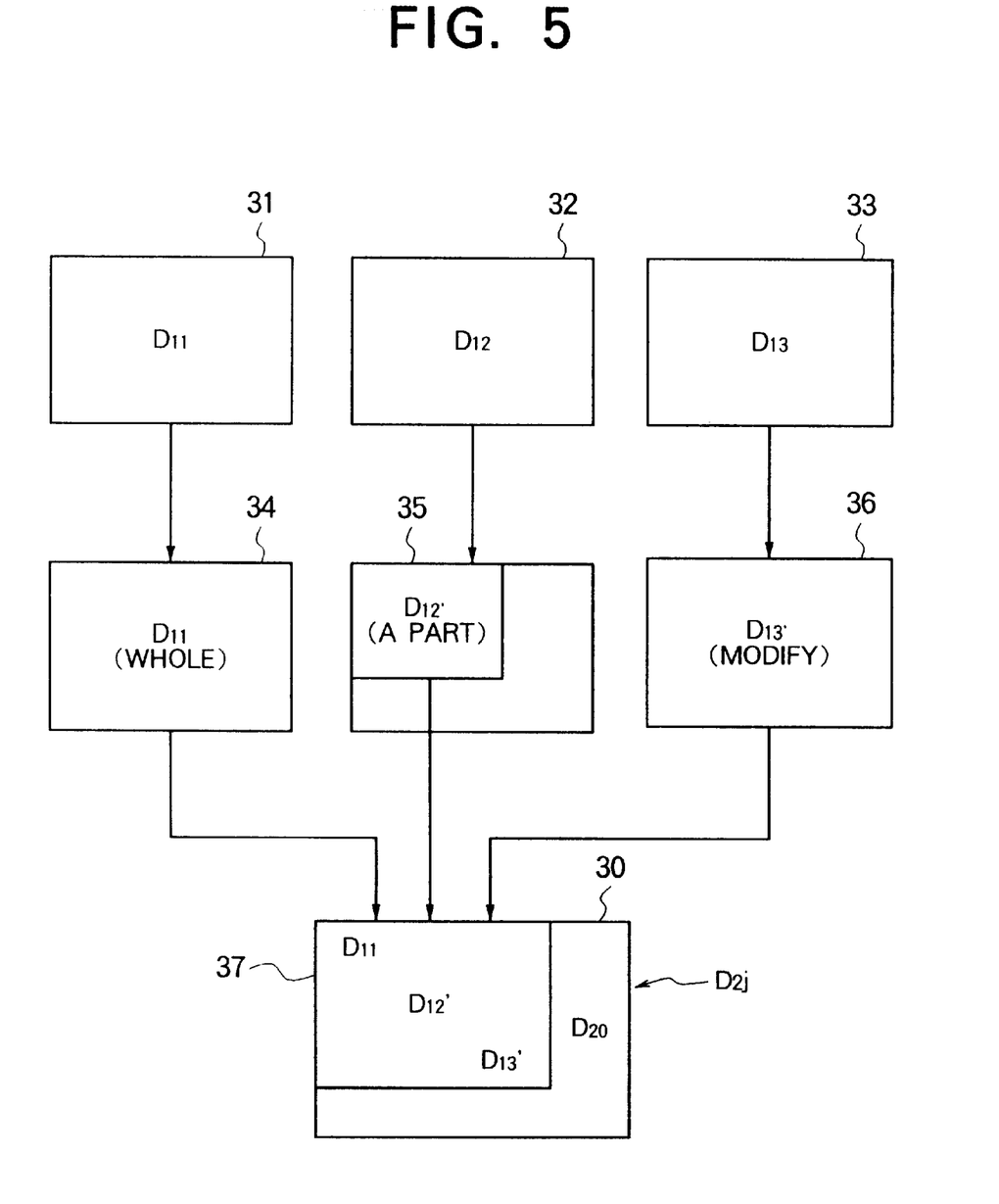
FIG. 5 is a block diagram for explaining a process for producing new copyrighted data from a plurality of a copyrighted data as objects.

In FIG. 5, reference numerals 31, 32 and 33 represent copyrighted primary data D11, D12 and D13 which comprise objects respectively. By utilizing the copyrighted primary data D11, D12 and D13, the new copyrighted secondary data D2$j$ represented by 30 is produced. The utilization of the copyrighted data D11, D12 and D13 include three editorial forms: utilization of whole parts such as the copyrighted data D11 shown by reference numeral 34; utilization of a part such as the copyrighted data D12' as shown by reference numeral 35; and utilization after modifying such as the copyrighted data D13' as shown by reference numeral 36.

The copyrighted data are edited by linking in object-unit, referring, embedding and combining them. Such embedding and combining can be performed freely. Also, it is possible to add other matters to the copyrighted data 37, which has been thus embedded and combined. The newly produced copyrighted data D2$j$ in this way consists of an assembly of objects.

In the plaintext copyrighted secondary data D2$j$ thus produced, secondary exploitation right of the primary user 13 who has newly produced arises in addition to the copyright of the copyrighted primary data D1$i$. To execute the secondary exploitation right, it is necessary to encrypt the plaintext copyrighted secondary data. For this purpose, the primary user 13 prepares the third crypt key K3*j* and encrypts the plaintext copyrighted data D2*j* using the third crypt key K3*j*:

$$ED2j = E(K3j, D2j),$$

and the encrypted copyrighted data ED2*j* is supplied to the secondary user 19 by copying it to an external storage medium 18 or by transferring it via the network 14. In order that a tertiary user can easily receive the third crypt key K3*j*, the third crypt key K3*j* is registered at the key control center 12. By registering the third crypt key K3*j*, the secondary exploitation right of the primary user 13 is recorded at the key control center 12.

In this case, the information sent from the primary user 13 to the key control center 12 at this time includes, in addition to a plurality of the third crypt keys K3*j* the number of which corresponds to the produced plural copyrighted secondary data, the number of the third crypt keys K3*j*, the second crypt key K2*j*, the copyrighted primary data used, information of the other copyrighted data to which the copyright management program is linking, access path to the copyrighted data used, application program used by the copyrighted data used, and explanation of the copyright works.

The secondary user 19, who desires to utilize the encrypted copyrighted secondary data ED2*j* and is thus supplied, sends a request for distribution of the third crypt key K3*j* to the key control center 12. Upon receiving the request for distribution of the third crypt key K3*j*, the key control center 12 sends the third crypt key K3*j* to the secondary user 19 via the network system 14. The secondary user 19 receives the third crypt key K3*j*, decrypts the encrypted copyrighted secondary data ED2*j* using the third crypt key K3*j*, and utilizes it.

When the third crypt key K3*j* is received, the copyright management program Pc attaches the copyright label Lc2*j* to each copyrighted data D2*j* so that the secondary user can utilize it. At this time, the linkage with the copyrighted data, which is the object linked with the newly produced copyrighted data, is released. At the time of the release of the linkage, the entity of the copyrighted primary data, which has had so far relationship as the linkage only, is embedded into the encrypted copyrighted secondary data ED2*j*, thereby allowing distribution as a copyright work only through ED2*j* file. In this case, if the encrypted copyrighted secondary data ED2*j* is to be utilized again, decryption and encryption are performed using the third crypt key K3*j*.

The key control center sends back the third crypt key K3*j* to the requester, and charges and collects the fee according to the copyright labels Lc1 and Lc2. The copyright owner of the copyrighted data can change access path of own copyrighted data by applying to the key control center. The copyright owner of the copyrighted data can also edit (modify) his own copyrighted data using the third crypt key K3*j* and also can register it using another key.

Thus, a method and apparatus for database copyright control has been described in conjunction with one or more specific embodiments. The invention is defined by the claims and their full scope of equivalents.

We claim:

1. A data copyright management method wherein:

a primary user receives a copyrighted primary date which is encrypted by a first use permit key from a database;

said primary user requests a key control center to distribute said first use permit key;

said key control center distributes said first use permit key to said primary user;

said primary user decrypts said encrypted copyrighted primary data to plaintext by using said first use permit key and performs primary utilization of the data;

said primary user requests said key control center to distribute a second permit key;

said key control center distributes said second use permit key to said primary user;

said primary user edits said copyrighted primary data using said received second use permit key;

said copyrighted primary data under editing is encrypted by using said second use permit key to be stored.

* * * * *